J. H. BROWN.
MANUFACTURE OF SULFURIC ACID.
APPLICATION FILED JULY 16, 1918.

1,365,964.

Patented Jan. 18, 1921.

Inventor
James Herbert Brown,
By Knight &c.
His Atty.

UNITED STATES PATENT OFFICE.

JAMES HERBERT BROWN, OF MANCHESTER, ENGLAND.

MANUFACTURE OF SULFURIC ACID.

1,365,964.     Specification of Letters Patent.     Patented Jan. 18, 1921.

Application filed July 16, 1918. Serial No. 245,242.

*To all whom it may concern:*

Be it known that I, JAMES HERBERT BROWN, a subject of the King of Great Britain, residing at Manchester, in the county of Lancaster and Kingdom of England, have invented certain new and useful Improvements in Manufacture of Sulfuric Acid, of which the following is a specification.

This invention relates to an improved process and plant for the manufacture of sulfuric acid by the chamber or like process. It is the object of the invention to produce a clean and pure acid direct even when starting from arsenical fumes.

If mechanical burners are employed the quantity of dust carried by the burner gases is large, and this dust is not removed by the usual dry dust chambers. Consequently the acid in the Glover tower is made very dirty, and when arsenical pyrites are used, highly arsenical. It is therefore diluted, de-arsenicated and re-concentrated. The present invention aims at overcoming these difficulties.

According to the invention in its preferred form, a burner, particularly a mechanical burner, is combined with a dust chamber, a wash tower fed with acid of about 100° to 140° Tw. two filters of graded coke, a fan, a small coke box preferably fed with strong acid, a heat interchanger heated by the dust chamber, a gas heater, and a Glover tower after which the gases pass forward to the lead chambers in the usual way.

The words chamber plant are used in the specification and claims as including any plant in which sulfuric acid is formed from sulfur dioxid water and oxygen by the agency of oxids of nitrogen; thus the expression chamber plant will be used for brevity to include plants in which all the chambers are replaced by towers in known manner, and so on.

Figure 1:
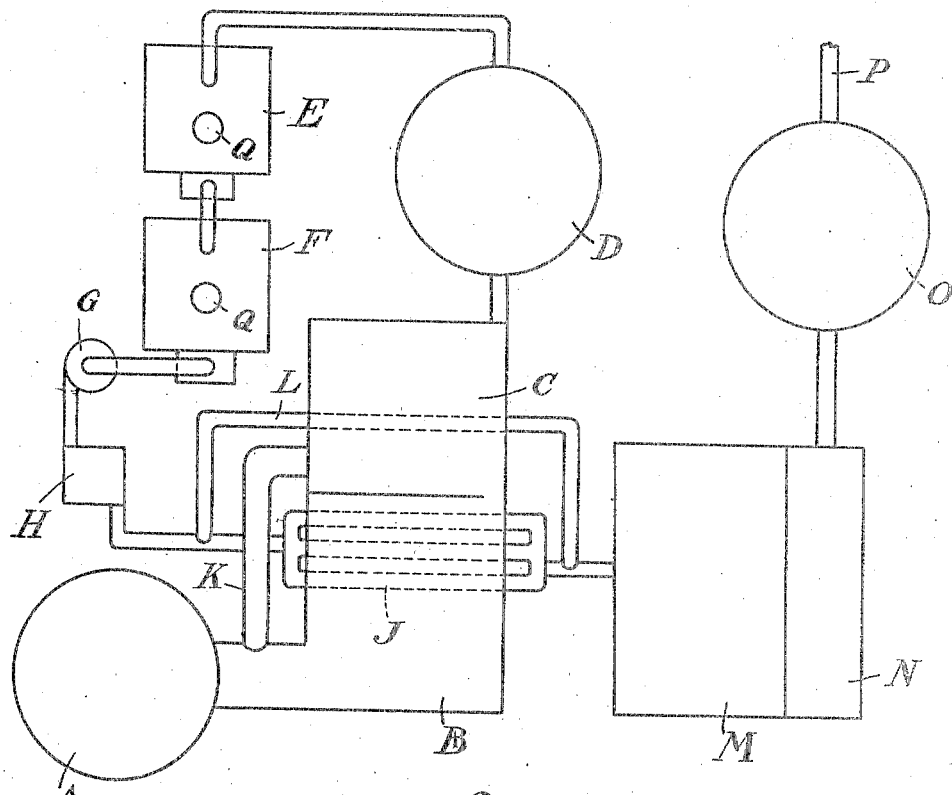
Figure 2:
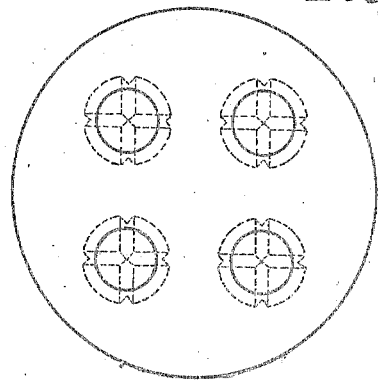
Figure 3:
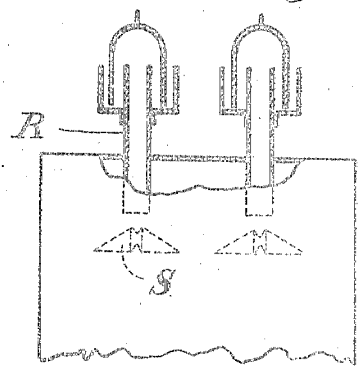

In the accompanying drawings, Figure 1 is a diagrammatic plan of the plant, Figs. 2 and 3 are diagrammatic views in plan and elevation of a distributer.

The burner gases leave the burner A, which is shown as a mechanical burner, and enter the dust chamber which is provided with baffles or circuitous passages in any known manner. The dust chamber consists of two parts B and C and a by-pass K is provided to cut out the portion B if desired. D is the wash tower which is preferably of about the same size as an ordinary Glover tower, and constructed in substantially the same manner, except that a special distributer is provided as shown more fully in Figs. 2 and 3. Down the wash tower is circulated the washing fluid (preferably acid of about 100° to 140° Tw.=1.500 to 1.700 spec. gravity) by suitable elevators or pumps. Other washing means may be employed if desired. From the wash tower D the gases pass through two filters E and F in series. These filters may be packed with coke graded in size, coarse at the bottom and fine on top; the gases preferably pass downward through the coke. Manholes Q are provided in the form of luted lead bells for the purpose of cleaning. The gases are then led to a fan or blower G from which they pass through a small coke scrubber H to remove drops of acid condensed by the fan. It is advisable to allow a trickle of strong acid (say 150° Tw. or upward) to run down this scrubber in order to dry the gases further, so as to protect the iron pipes J which pass through the dust chamber and are heated by the hot burner gases. A by-pass L is provided so that the gases may be caused to miss the heater pipes J if desired; they then enter the gas heater M which may be of any known type, and pass therefrom through an upshaft N containing the potting oven, to a Glover tower O. The gases leave the Glover tower at P and enter the chambers and finally the Gay Lussac towers in the ordinary manner.

If it is desired to cut out the heat-interchanger pipes J, this can be done by closing dampers in the mains and opening dampers in the by-passes K and L. The fan G is best placed as shown though if it is desired to protect the fan still further, it may be placed after the scrubber H fed with fairly strong acid; the gases entering the fan will then be reasonably dry; in this case however it will be advisable to place a small coke scrubber (which need not be fed with acid) between the fan and the pipes J to catch any condensate. In some cases the fan may be placed between the dust chamber and the wash tower, or between the heat interchange pipes J and the gas heater, but the fan will then be dealing with hot gases and the mechanical difficulties of working are thereby increased considerably.

The dust chamber removes much of the dust but a large amount is removed by the wash tower, and the wash acid therefore contains much dissolved and suspended impurity. From time to time this acid is settled in tanks, and the clear liquor separated from the sludge. It is found however that the acid entering the top of the wash tower soon chokes in the usual forms of distributer and therefore a special distributer is provided of such dimensions and form that it will not choke up. It is found for instance that 1 inch dia. pipes are too small, and the best arrangement is shown in Figs. 2 and 3 where R represents four 2 inch dia. pipes provided with luted tops for admission of feed acid. The acid from these pipes discharges on to distributers S supported on top of the tower packing inside the tower itself. These distributers consist of slightly domed brick members of circular section with radial channels. Obviously other forms of distributer can be employed but the important point to note is that the distributers must be of such form that they cannot become choked by the impurities which either settle out or crystallize out from the wash acid.

The wet coke filters remove the final traces of arsenic from the cooled gases, and it is found in practice that by this process and plant it is possible to produce Glover tower acid of high strength which is water-white and is dearsenicated down to say 5 to 10 parts per million or less even when using arsenical pyrites.

I declare that what I claim is:—

1. The combination with a chamber plant of a burner, means for washing the burner gases and reheating the washed gases prior to oxidation.

2. The combination with a chamber plant of a burner, means for washing the burner gases, means for filtering the gases and means for reheating the purified gases prior to oxidation.

3. The combination with a chamber plant of a burner, a dry dust collector, means for washing the gas, means for filtering the gas, and means for reheating the purified gas prior to oxidation.

4. The combination with a chamber plant of a burner, means for washing the burner gases, and a gas heater to re-heat said gases prior to oxidation.

5. The combination with a chamber plant of a burner, a wash tower for the burner gases, means to reheat the burner gases, and means for delivering the washed and reheated gases for oxidation.

6. The combination of a burner, means for cooling and purifying the burner gases, a fan or blower, a scrubber placed after the fan, means to reheat the purified gases, and a chamber plant.

7. The combination of a burner, means for cooling and purifying the burner gases, means for drying the purified gases, means for reheating the purified gases, and a chamber plant receiving the gases thus prepared.

8. The combination of a burner, a wash tower for washing the burner gases, and means to distribute the wash acid, over the packing of said tower, said distributing means comprising pipes and distributer surfaces so arranged and of such dimensions as to prevent choking by deposition or crystallization of impurities, with means for reheating the washed gases, and a chamber plant.

9. A process of manufacturing sulfuric acid which includes the steps of washing, filtering and reheating burner gases before passing them into a concentrating and denitrating zone.

10. A process of manufacturing sulfuric acid which includes the steps of washing the burner gases with acid of about 100° to 140° Tw., filtering the washed gas and reheating the filtered gas before passing them into a concentrating and denitrating zone.

11. A process of manufacturing sulfuric acid which includes the steps of washing the burner gases and reheating said purified gases before passing them into a concentrating and denitrating zone.

12. A process of manufacturing sulfuric acid which includes the steps of washing and filtering the burner gases, and reheating said filtered gases by the hot burner gases before passing said gases into a concentrating and denitrating zone.

13. A process of manufacturing sulfuric acid which includes the steps of wet filtration of the burner gases and reheating said gases before passing them into a concentrating and denitrating zone.

In witness whereof, I have hereunto signed my name this 25th day of June, 1918, in the presence of two subscribing witnesses.

JAMES HERBERT BROWN.

Witnesses:
 Ernold Simpson Moseley,
 George Weaver.